United States Patent [19]
Tompkins

[11] Patent Number: 5,358,194
[45] Date of Patent: Oct. 25, 1994

[54] REEL BRAKING MECHANISM FOR TWO PIECE VIDEOCASSETTE SYSTEM

[75] Inventor: Carole A. Tompkins, Blacksburg, Va.

[73] Assignee: Minnesota Mining and Manufacturing Company, Saint Paul, Minn.

[21] Appl. No.: 183,630

[22] Filed: Jan. 19, 1994

Related U.S. Application Data

[63] Continuation of Ser. No. 811,006, Dec. 20, 1991, abandoned.

[51] Int. Cl.5 .............................................. G11B 23/087
[52] U.S. Cl. .................................. 242/338.3; 242/343
[58] Field of Search ............... 242/198, 199; 360/132

[56] References Cited

U.S. PATENT DOCUMENTS

| | | | |
|---|---|---|---|
| 3,227,387 | 1/1966 | Laa et al. | 242/198 |
| 3,672,603 | 6/1972 | Swain | 242/198 |
| 4,232,840 | 11/1980 | Sugawara | 242/198 |
| 4,470,560 | 9/1984 | Yoneya et al. | 242/198 |
| 4,513,929 | 4/1985 | Oishi et al. | 242/198 |
| 4,524,926 | 6/1985 | Nemoto et al. | 242/198 |
| 4,638,393 | 1/1987 | Oishi et al. | 360/132 |
| 4,903,915 | 2/1990 | Iwahashi | 242/198 |
| 4,918,558 | 4/1990 | Igarashi et al. | 242/198 |
| 4,920,436 | 4/1990 | Novak | 242/199 |
| 4,985,798 | 1/1991 | Onmori et al. | 360/132 |
| 5,002,237 | 3/1991 | Hirayama | 242/74.1 |
| 5,082,196 | 1/1992 | Turgeon | 242/199 |

Primary Examiner—Daniel P. Stodola
Assistant Examiner—John Q. Nguyen
Attorney, Agent, or Firm—Merchant, Gould, Smith, Edell, Welter & Schmidt

[57] ABSTRACT

Reel brakes for inclusion in a cartridge-to-cassette adaptor which can be released by either a manual winder structure or a tape transport carried release pin.

1 Claim, 3 Drawing Sheets

REEL BRAKING MECHANISM FOR TWO PIECE VIDEOCASSETTE SYSTEM

This is a continuation of application Ser. No. 07/811,006 filed Dec. 20, 1991 now abandoned.

BACKGROUND OF THE INVENTION

1. Field of the Invention

The present invention relates to reel brakes for use in a two-piece videocassette. One piece is a removable cartridge and the second piece is a complimentary videocassette adaptor. Together the two piece assembly emulates an industry standard videocassette.

2. Description of the Prior Art

It has become common to use magnetic recording media supplied in a cassette format for consumer videotape applications. The traditional cassette format includes both a supply reel and a take-up reel. The tape is wound on to the supply reel. One end of this tape is permanently attached to this supply reel and the other end of the tape is permanently attached to the take-up reel. In the cassette, the supply reel and the take-up reel share the same housing, and, in use the videotape machine transports the tape between the two reels. This packaging strategy is inefficient for tape storage due to the inclusion of an empty reel in the package. In applications such as video cameras, the adoption of the cassette format has reduced the amount of tape available for use, and has required the development of specialized cassette-to-cassette adaptors.

For example, cassette-to-cassette adaptors which convert one cassette format to another cassette format are widely known and used as evidenced by U.S. Pat. No. 4,544,970 to H. Ogata. This patent teaches an adaptor or carrier which converts a miniature format videotape cassette to the standard VHS cassette format. This type of apparatus is used to provide VHS playback capabilities for consumer videotape cameras.

It has been proposed to supply magnetic recording media in a more compact and space efficient cartridge format for a variety of applications. In the cartridge format, the housing contains a single supply reel for storing tape. The "free" end of the tape must be threaded or other wise attached to a remote take-up reel.

Tape cartridges of various types have been in common use for storing magnetic media as evidenced by U.S. Pat. No. 4,826,101 to Smith, which teaches a single reel supply cartridge for storing magnetic tape. This type of cartridge is used in the computer industry.

Cartridge-to-cassette adaptors which convert a cartridge format product to a cassette format application are also known as evidenced by U.K. Patent Application No. 2,217,684 A to Davis for example. This reference teaches a videotape application of a single supply reel cartridge product.

Another example of a cartridge-to-cassette adaptors for videotape products is known from U.S. Pat. No. 4,920,436 to Novak. Novak teaches, inter alia, a carrier or adaptor which is used to adapt a videotape cartridge to an industry standard videocassette format. With respect to the cartridge-to-cassette adaptor context, Novak provides a reel brake which prevents reel rotation in the "unwind" direction when the cartridge is out of the adaptor.

With respect to the videotape cassette product context, the "betamax" and "VHS" format cassettes among others provide brake structures. For example, U.S. Pat. No. 4,232,840 to Sugawara, teaches a pair of reel lock levers for preventing the reel from rotating at least in the tape unwinding direction.

Reel brakes are common in other cassette formats as well, as typified by U.S. Pat. No. 4,288,048 to Sieben, which teaches levers which may be actuated from outside the cassette.

With respect to the cartridge format context, U.S. Pat. No. 4,555,077 to Platter, et al. teaches radially disposed teeth arrays which immobilize the reel when the teeth mesh with a housing.

SUMMARY OF THE INVENTION

The context for the present invention is a two-piece videocassette which comprises a removable videotape cartridge, and a complimentary adaptor. The insertion of the cartridge into the adaptor produces an assembly which emulates the industry standard T-120 VHS videotape cartridge.

In contrast to the prior art cartridge-to-cassette adaptors, the adaptor of the present invention contains reel brakes which can be released by either the videotape transport or by a user operated winder mechanism.

Functionally, brake release by the tape transport of the videotape machine, occurs when the cartridge is inserted into the videotape machine and the tape transport brake release pin enters the adaptor through a release aperture, formed in the floor of the adaptor housing. This operation releases a pair of brake arms which release both the supply reel and the take-up reel.

Winder key release of the brakes occurs when the user lifts or elevates the winding key into the upright winding position. Structurally, the lower flange of the supply reel and the lower flange of the take-up reel have a gear teeth formed on the periphery. These gear teeth are used to rotate the respective reels under the control of the manual winder key. These teeth also interact with the pair of brake levers, and form a portion of the reel brake structure.

BRIEF DESCRIPTION OF THE DRAWING

Throughout the drawing, identical reference numerals refer to identical structural elements, wherein.

DETAILED DESCRIPTION OF THE INVENTION

Figure 1:
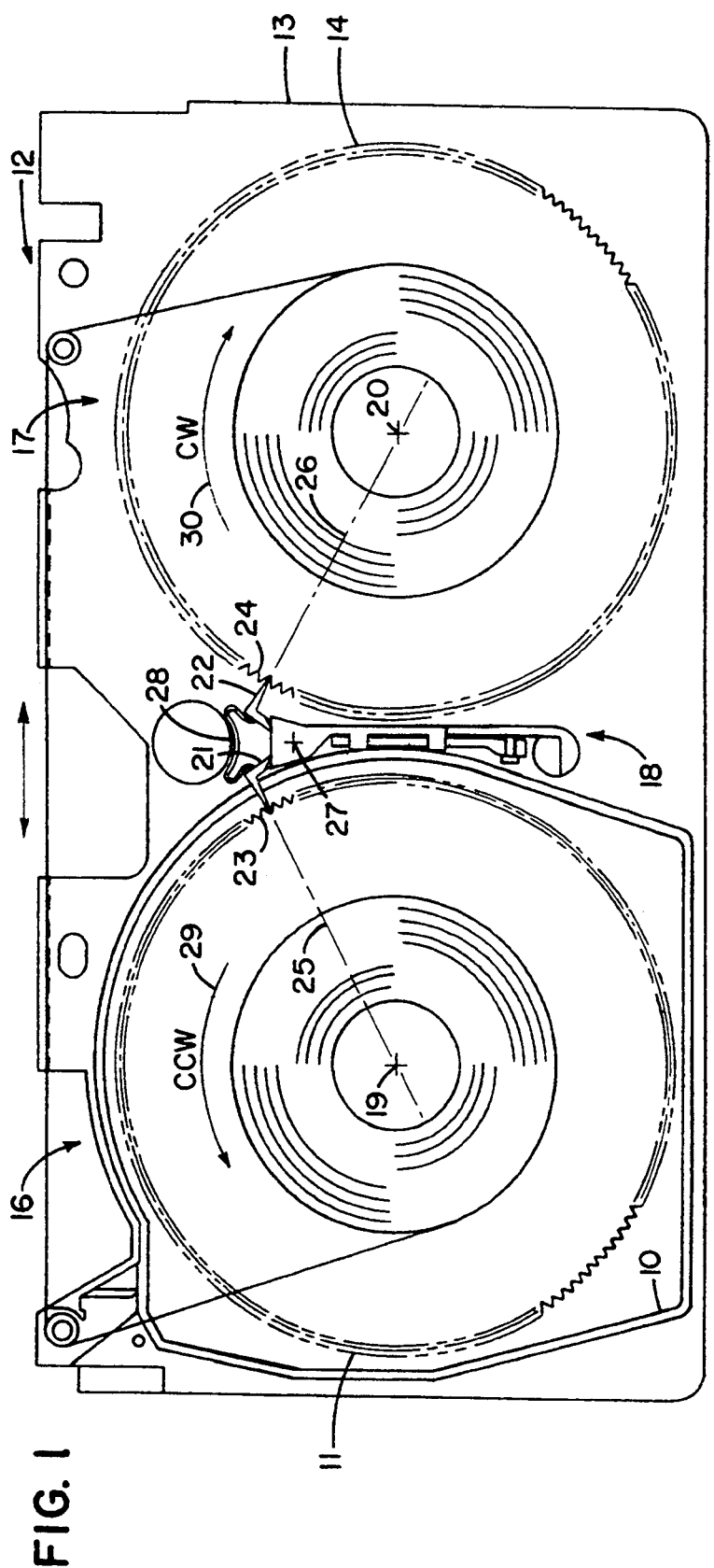
FIG. 1 is a schematic plan view depicting the components of the adaptor.

FIG. 1 shows a videotape cartridge 10 positioned in the complimentary adaptor 12. The cartridge 10 contains a supply reel 11 while the adaptor housing 13 contains a take-up reel 14. The adaptor housing 13 has a cartridge reception cavity 15 laterally disposed from the take-up reel 14. The cavity 15 and take-up reel 14 define a "supply side" 16 and a "take-up side" 17 for the housing 13. The brake assembly 18 is located within the adaptor housing 13 between the supply side 16 and the take-up side 17.

The supply reel has an axis of rotation 19 and the take-up reel 14 has an axis of rotation 20. The brake assembly 18 has a supply reel brake arm 21 and take-up reel brake arm 22. These arms 21 and 22 engage the teeth formed on the lower supply reel flange 23 and the take-up reel flange 24. The arms 21 and 22 approach and engage the reel flanges 23 and 24 on substantially radial paths depicted in the FIG. 1 by position lines 25 and 26. The arms 21 and 22 are pivoted in the floor of the housing and both rotate about a single axis 27. The arms 21 and 22 are biased into an engaged or locked position by bias spring 28, which is anchored in the housing 13 and which directly contacts both arms.

Rotation of the supply reel 11 in the counterclockwise direction 29 expels the arm 21 from the flange 23 while clockwise rotation 30 of the take-up reel 14 expels the arm 22 from engagement with the flange 24. Both of these motions are permitted when the brake assembly is in the locked position and these motions permit slack tape to be "taken up" onto either the supply reel 11 or the take-up reel 14 while the cartridge 10 is in the adaptor 12. However reverse rotation of the supply reel 11 in the clockwise direction is prevented. Likewise, reverse rotation of the take-up reel 14 in the counterclockwise direction in prevented. Attempted motion in the reverse direction will cause the arms to move toward the centers of the reels effectively locking them from reverse rotation while the brake assembly is in the locked position.

Figure 2:
FIG. 2 is a detail plan view of the brake assembly depicting interaction between the reels and the brake arms, showing the brake assembly in the locked position.

FIG. 2 depicts this "locked position" in detail showing the engagement of the arms 21 and 22 with their respective flanges 23 and 24. Although the two arms 21 and 22 share the same pivot axis 27 they are capable of independent motion.

Figure 3:
FIG. 3 is a detail plan view of the brake assembly depicting interaction between the reels the brake arms showing the brake assembly in the unlocked position.

FIG. 3 depicts the brake assembly 18 in the "unlocked position". The yoke 32 is capable of motion along a linear path shown by position line 31. Advancement of the yoke toward the arms causes the arms to move together retracting them from their respective reel flanges 23 and 24. As shown in phantom view, the yoke has a V-shaped feature 33 which engages a pair of complimentary surfaces 34 and 35 formed on the arms. Cooperation between these inclined surfaces causes the arms to retract, releasing the brakes.

Figure 4:
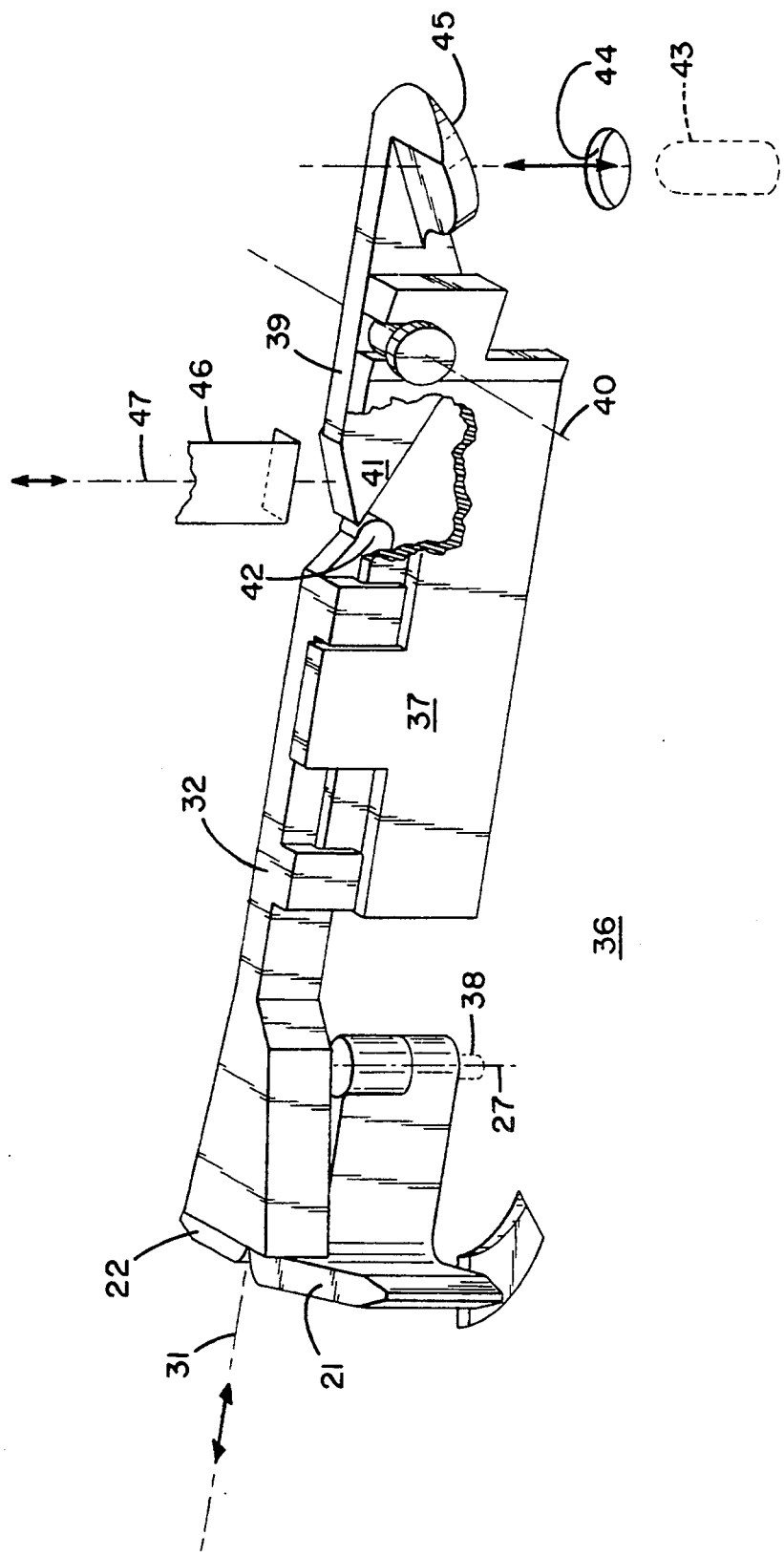
FIG. 4 is a detail perspective view of the brake assembly in isolation.

FIG. 4 is a perspective view of the brake assembly in isolation. The floor 36 of the housing 13 has an upstanding rib 37 which locates the yoke 32 and permits linear motion along position line 31. The floor 36 also anchors the pivot pin 38 which permits rotation of arms 21 and 22 about axis 27. Linear motion is imparted to the yoke 32 by the bias spring 28 (shown in FIG. 1) and the rocker arm 39. The rocker arm 39 is journaled in the rib 37 and can rotate about axis 40. The rocker arm 39 has nose section 41, which engages a cam surface 42 formed on the yoke 32. This pair of surfaces translates rotational motion of the rocker arm 39 into linear motion of the yoke 32 and visa versa.

There are three sources of power which cause rotation of the rocker arm 39. The first is the bias spring 28 seen in FIG. 1 which acts directly on the arms 21 and 22, and which supplies force to bias these arms into the locked position. The second source of power is the release pin 43 which is present in the videotape transport and which enters the adaptor through an aperture 44 formed in the floor 36 of the adaptor. This release pin 43 engages the pad 45 which forces rotation of rocker arm 39 causing brake release. The third source of power is the user who elevates a winding key. This motion ultimately moves strut 46 downward along the path indicated by position line 47 to engage the nose 41 of the rocker 39. Depressing the nose 41 advances the yoke 32 to retract the arms 21 and 22.

Figure 5:
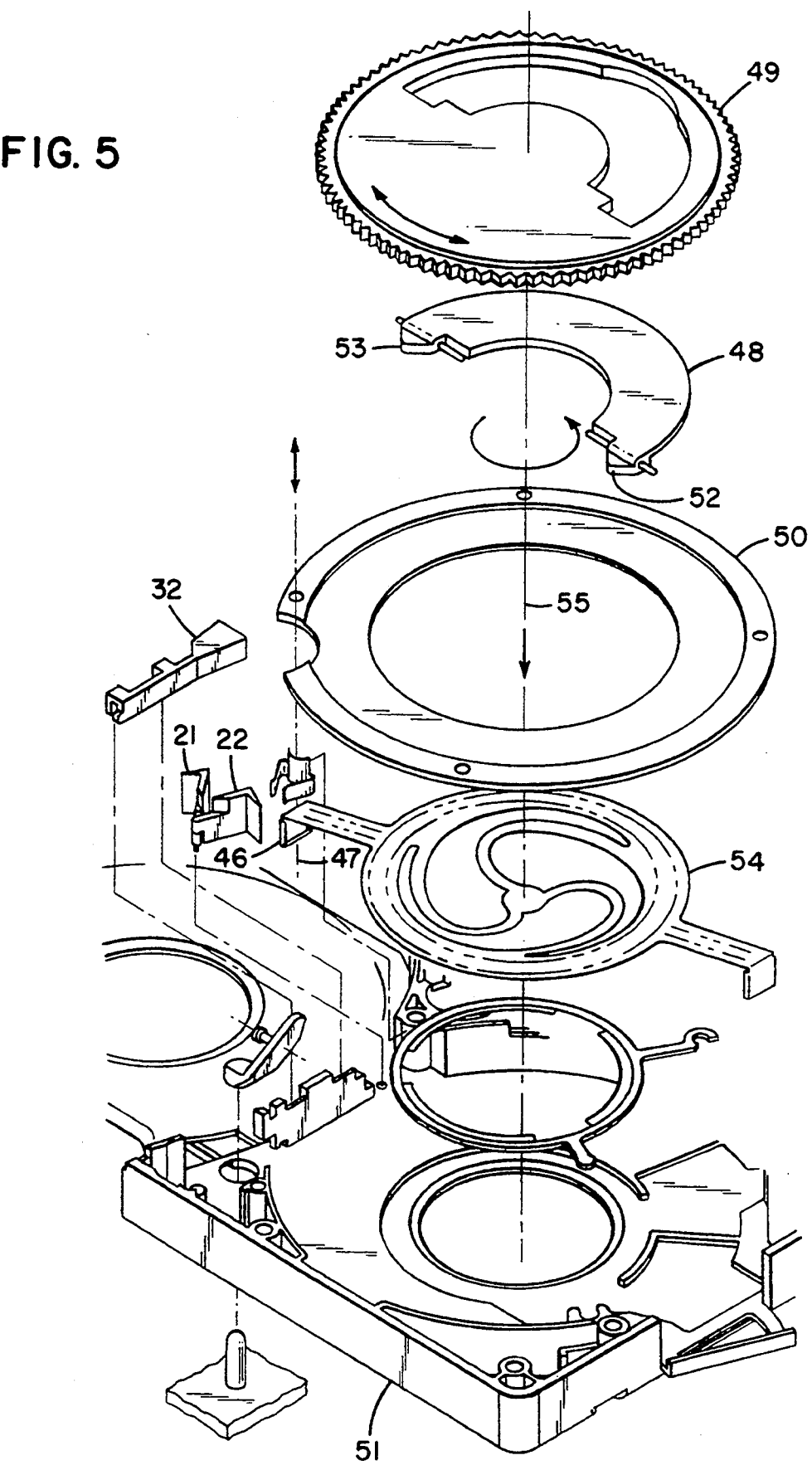
FIG. 5 is a fragmentary perspective view of the brake assembly in the adaptor.

FIG. 5 is an exploded view of the structures which cooperate to release the brakes during the winding operation. Many of the components involved in the winding operation are not shown in the drawing to improve their clarity. However reference may be had to companion U.S. patent application Ser. No. 07/481,986 filed Feb. 20, 1991 and U.S. patent application Ser. No. 07/398,069 filed Aug. 24, 1989 and U.S. Pat. No. 5,034,842 to Turgeon, which describe the winding function in greater detail and which are incorporated by reference herein. In general terms, the insertion of the cartridge into the adaptor "makes" a connection between a "tape connector" carried in the cartridge and a "tether connector" present in the adaptor. This interconnection hardware needs to be transported across the tape path and loaded onto the take-up reel prior to using the adaptor/cartridge combination in a videotape machine. In use, the user loads a cartridge into the adaptor and elevates the winding key and turns it to move the interconnection hardware onto the take-up reel. This process must release the brakes to permit unencumbered rotation of reels. This brief discussion returns us to FIG. 5.

In FIG. 5 the winding key is shown as 48. The key 48 is journaled in a winder gear 49. The winder gear 49 is positioned by ring 50 which is connected to the upper half of the housing which is not shown. This upper "half" is connected to the lower "half" of the housing which is shown in FIG. 5 as 51. When assembled, the winder key 48 can be elevated and protrudes from the upper half of the housing where it can be operated by a user. Elevation of this winder key 48 causes the ears 52 and 53 to contact the plate 54, forcing the plate downward in the sense of FIG. 5. Downward motion along position line 55, causes strut 46 to move along position line 47 into engagement with the rocker arm 39 as discussed in connection with FIG. 4. This motion releases the brake arms 21 and 22 through the motion of the yoke 32 as previously discussed. One should note that, the plate 54 has a circular track 55 which allows the ears 53 and 52 to keep the strut 46 depressed regardless of the rotational position of the winding key 48.

What is claimed is:

1. A tape cartridge-to-cassette adaptor of the type used with a cassette transport, said transport having a release pin, said adaptor of the type used to convert a single supply reel cartridge to a multiple reel cassette format, said supply reel having a flange, said flange having a plurality of gear form teeth projecting from the periphery of said flange defining a supply reel gear flange, said adaptor comprising:

an adaptor housing having a cartridge reception cavity;

a take-up reel located in said adaptor housing laterally adjacent said cartridge reception cavity, said take-up reel having a flange, said flange having a plurality of gear teeth projecting from the periphery of said flange defining a take-up reel flange;

said take-up reel flange and said supply reel flange lying in the same plane;

said take-up reel having a first axis of rotation and said supply reel having a second axis of rotation, said first axis and said second axis being parallel;

first and second brake levers pivotally mounted about a third axis parallel to said first and second axis and having respective first and second arms;

said first arm adapted to engage the gear teeth of said supply reel gear flange;

said second arm adapted to engage the gear teeth of said take-up reel gear flange;

whereby engagement with said supply reel gear flange and said take-up reel gear flange by said first and second arms defines a locked position;

biasing means for urging said arms into said locked position;

retraction means for disengaging said first and second arms from said supply reel gear flange and said take-up reel gear flange defining an unlocked position; and said retraction means including user operable winder means for moving said first and second arms into said unlocked position, and release pin operable means, having a pivot axis orthogonal to said first and second axes for moving said first and second arms into said unlocked position.

* * * * *

UNITED STATES PATENT AND TRADEMARK OFFICE
CERTIFICATE OF CORRECTION

PATENT NO. : 5,358,194

DATED : October 25, 1994

INVENTOR(S) : Carole A. Tompkins

It is certified that error appears in the above-identified patent and that said Letters Patent is hereby corrected as shown below:

In column 1, line 20, after the word "wound", please delete "on to", and insert therefor --onto--
In column 1, line 68, please delete the word "betamax" and insert therefor --"Betamax"--
In column 2, line 42, please delete the word "DRAWING" and insert therefor --DRAWINGS--
In column 2, line 43, please delete the word "drawing" and insert therefor --drawings--
In column 2, line 52, after the word "reels", please insert the word --and--
In column 4, line 1, after numeral "39", please insert --about axis 40--
In column 4, line 11, please delete the words "their clarity", and insert therefor --the clarity of the figure.--
In column 4, line 16, before the word "incorporated", please insert the word --collectively--
In column 4, line 17, the word "In" should begin a new paragraph
In column 4, line 43, before the word "rocker", please insert the words --nose 41 of the--
In column 4, line 48, please delete "53 and 52", and insert therefor --52 and 53--
In column 5, line 5, after the word "second" please delete the word "axis" and insert therefor --axes--

Signed and Sealed this

Eighteenth Day of April, 1995

Attest:

BRUCE LEHMAN

Attesting Officer

Commissioner of Patents and Trademarks